United States Patent
Fukuda

[11] Patent Number: 5,949,956
[45] Date of Patent: *Sep. 7, 1999

[54] VARIABLE BIT RATE VIDEO ENCODER, AND VIDEO RECORDER, INCLUDING CODE AMOUNT ALLOCATION

[75] Inventor: Hideki Fukuda, Katano, Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/938,838

[22] Filed: Sep. 26, 1997

Related U.S. Application Data

[62] Division of application No. 08/530,762, Sep. 19, 1995, abandoned.

[30] Foreign Application Priority Data

Sep. 22, 1994 [JP] Japan .................................... 6-227910
Sep. 22, 1994 [JP] Japan .................................... 6-227911
Sep. 22, 1994 [JP] Japan .................................... 6-227912

[51] Int. Cl.$^6$ .............................. H04N 5/92; H04N 7/32
[52] U.S. Cl. .......................... 386/112; 348/384; 348/390; 386/111
[58] Field of Search .................................... 386/35, 45, 46, 386/109, 111–112; 360/8, 27; 348/419, 97, 96, 409, 410–416, 384, 390, 402, 405, 423; H04N 5/76, 5/92, 5/93, 9/79

[56] References Cited

U.S. PATENT DOCUMENTS

| | | | |
|---|---|---|---|
| 5,068,724 | 11/1991 | Krause et al. | 348/402 |
| 5,461,421 | 10/1995 | Moon | 348/402 |
| 5,473,370 | 12/1995 | Moronaga et al. | 348/231 |
| 5,481,303 | 1/1996 | Uehara | 348/231 |
| 5,530,478 | 6/1996 | Sasaki et al. | 348/405 |
| 5,534,921 | 7/1996 | Sawanobori | 348/231 |
| 5,576,758 | 11/1996 | Aai et al. | 348/231 |
| 5,585,845 | 12/1996 | Kawamura et al. | 348/231 |
| 5,587,805 | 12/1996 | Park | 386/111 |
| 5,594,598 | 1/1997 | Shikakura | 386/109 |
| 5,675,379 | 10/1997 | Kato et al. | 348/402 |

FOREIGN PATENT DOCUMENTS

| | | |
|---|---|---|
| 4-91587 | 3/1992 | Japan . |
| 5-227520 | 9/1993 | Japan . |
| 6-197329 | 7/1994 | Japan . |

*Primary Examiner*—Thai Tran
*Attorney, Agent, or Firm*—Wenderoth, Lind & Ponack, L.L.P.

[57] ABSTRACT

A degree of a difficulty of encoding a video signal in a given period of time is detected and converted with a specific transform characteristic to produce an allocated amount of codes. The video signal is quantized and variable length encoded to produce a second coded data. A quantizing parameter is determined so that a difference between a code length of the second coded data in the given period of time and the allocated amount of codes is minimized.

26 Claims, 12 Drawing Sheets

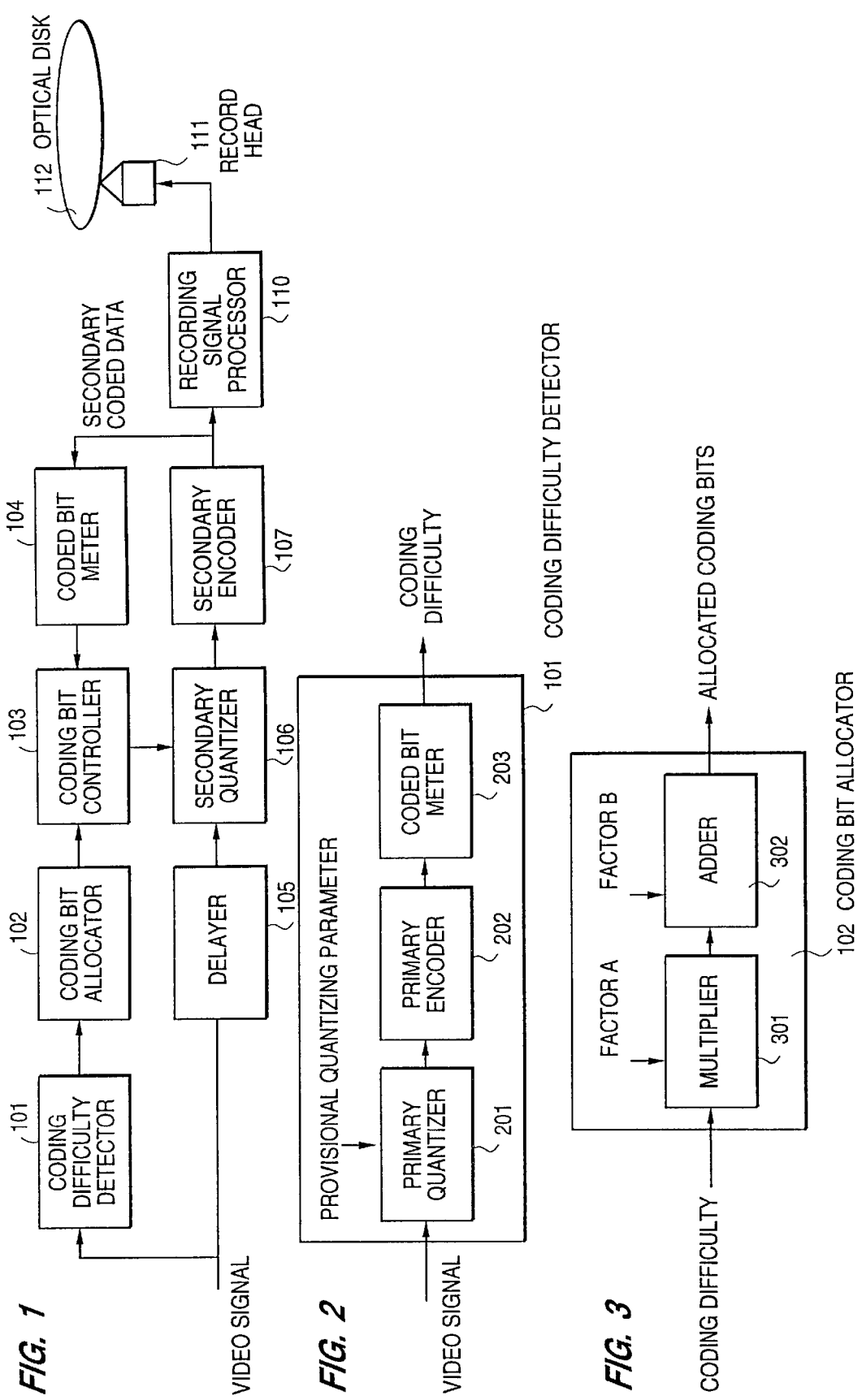

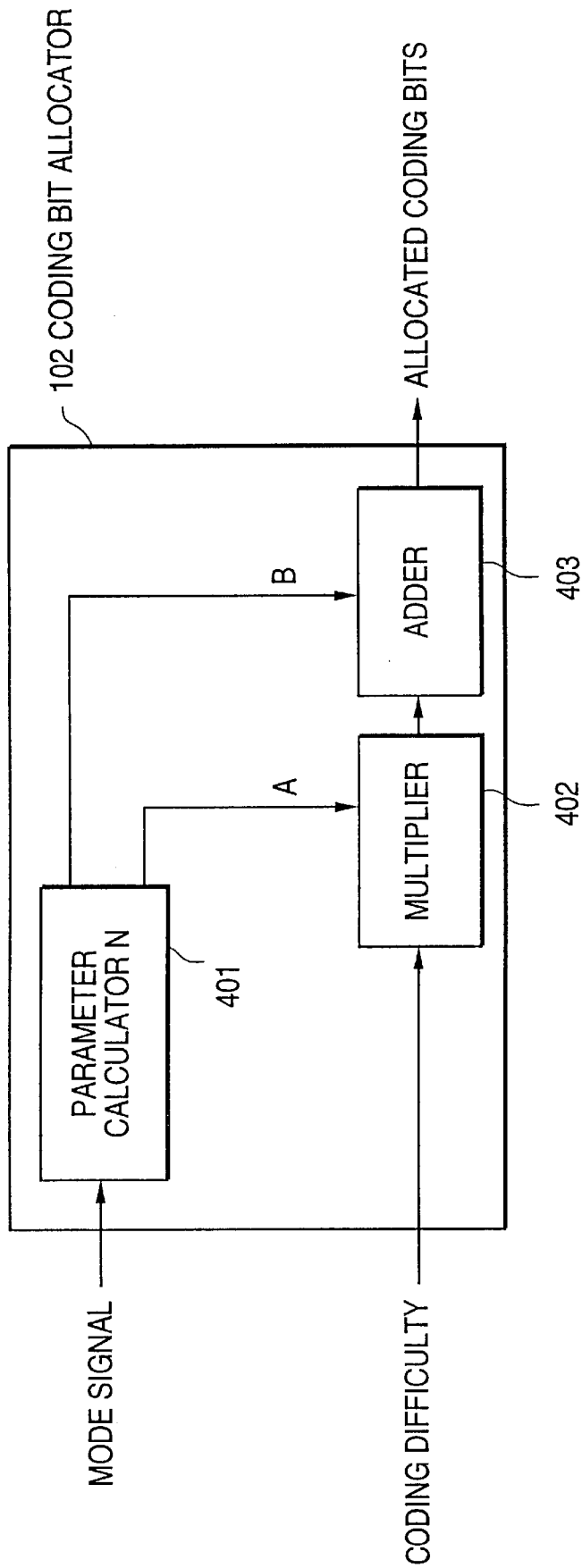

VARIABLE BIT RATE VIDEO ENCODER, AND VIDEO RECORDER, INCLUDING CODE AMOUNT ALLOCATION

This application is a divisional of now abandoned application, Ser. No. 08/530,762, filed Sep. 19, 1995.

BACKGROUND OF THE INVENTION

1. Field of the Invention

The present invention relates to a variable bit rate video encoding apparatus for use in recording compressed encoded video data on a recording medium such as an optical or magnetic disk, or in transmitting the same through a variable bit rate transmitting system. It also relates to a video recording apparatus for recording the encoded video data on the recording medium and to a recording medium on which the encoded video data are recorded.

2. Description of Prior Art

A transform encoding method is widely known for encoding a video signal, in which an image of the video signal is divided into blocks and each block comprising a given number of neighbor pixels is subjected to an orthogonal transform process such as discrete cosign transform. In the transform encoding method, a transform factor is quantized with a predetermined quantizing step width and subjected to compression encoding such as variable length encoding or Huffman encoding.

It is also known that a motion video data such as a television signal is encoded by an interframe encoding where a difference between frames is examined. In the interframe encoding, a target frame to be encoded is predicted by using a time preceding or succeeding frame called a reference frame for producing a prediction error signal. The prediction error signal is then encoded before being transmitted or recorded. An interframe prediction is carried out for each block of the given number of pixels and a motion data of the block is transmitted or recorded together with the prediction error signal.

Those steps are based on variable length encoding and an amount of generated bits are only identified after completion of encoding process. For maintaining the generated bits within a range of bit allocation, the generated bits are compared with an amount of allocated bits. A result of a comparison is used for updating a bit allocation, which is known as a feed-forward control method.

There are also developed a variety of methods of controlling the amount of the generated bits of variable length encoded data efficiently to be equal or close to a target amount, for example, by estimating a quantizing step width appropriate for making the amount of the allocated bits as close as possible to the target amount (See Japanese Patent Laid-open Applications 4-91586(1992), 5-227520(1993), and 6-197329(1994)).

It is essential in any of prescribed cases to control the amount of coding bits within an encoder so that an input buffer memory in a playback apparatus is not overflowed with data when a transmission rate of the coding bits for communications and broadcasting is constant.

Also, a difficulty of compression encoding a video signal is varied depending on its time or spatial dependent data size and when the video signal is encoded at a fixed bit rate, quality reproduction will hardly be maintained. In view of the fact that a video signal with a higher degree of a coding difficulty is more likely to deteriorate, some methods of encoding at a variable bit rate have been developed. Such methods should be associated with variable bit rate transmission methods which use optical disks or magnetic disks. Most of the variable bit rate encoding methods allow a quantizing step width for quantization to be fixed to a constant value for maintaining a quality of a reproduced image. There is provided another variable bit rate encoding method in which the quantizing step width is varied according to a motion in the image (Japanese Patent Laid-open Application 6-86264 (1994)).

It is also proposed to determine the amount of the allocated coding bits for a video signal depending on an available storage area of a given recording medium when recording the video signal on the recording medium (Japanese Patent Laid-open Application 6-55536(1994)). More particularly, the video signal is encoded by a primary encoding circuit to yield the amount of the generated bits and the amount of the allocated coding bits is determined by the generated bits. Using the allocated coding bits, the video signal is encoded again. The above procedure includes two encoding actions.

A quick real-time encoding technique may not be needed for recording a video signal on a read-only medium such as an optical recording disk. When a rewritable recording medium is used, the quick real time encoding technique is essential. Also, it is necessary to carry out the encoding with a bit rate not exceeding a maximum of a transmission bit rate for recording or reproducing. If the video signal has a balance of the coding difficulty exceeded in the variable bit rate encoding, its segment with a lower coding difficulty will be encoded at an excessively low bit rate thus declining in the quality when reproduced. In real-time encoding of the video signal with a variable bit rate for recording, it is desired for increasing the efficiency to calculate the amount of the allocated coding bits by considering the available storage area of the recording medium.

SUMMARY OF THE INVENTION

It is an object of the present invention to provide a variable bit rate video encoder in which for recording a video signal on a recoding medium, e.g. an optical disk or a magnetic disk, or transmitting the video signal along a transmission system compatible with a variable bit rate, a desired amount of bits determined by a length of the video signal and ranged between predetermined maximum and minimum values are used for encoding the video signal with minimum delay time thus ensuring quick real-time processing. It is another object of the present invention to provide a video recording apparatus capable of determining an amount of allocated coding bits according to an available storage area of a recording medium for optimum use of the recording medium.

For achievement of the object, a variable bit rate video encoder according to the present invention comprises: a coding difficulty detecting means for detecting a degree of a difficulty of encoding a video signal in a first predetermined period of time; a code amount allocating means for producing an allocated amount of codes by converting the difficulty according to a specific transform characteristic; a secondary quantizing means for quantizing the video signal by using a quantizing parameter; a secondary encoding means for variable length encoding an output of the secondary quantizing means to produce a second coded data; and a code amount controlling means for determining the quantizing parameter used by the secondary quantizing means so that a difference between a code length of the second coded data in the first predetermined period of time and the allocated amount of codes is minimized. A video recording apparatus of the present invention is formed of the variable bit rate video encoder equipped with a means for recording the second coded data on a recording medium.

Another variable bit rate video encoder according to the present invention comprises: a variable bit rate encoding means for producing a second coded data so that an amount of codes of the second coded data in a first predetermined period of time is a predetermined amount according to the video signal; a fixed bit rate video encoding means for producing a third coded data so that an amount of codes of the third coded data in a second predetermined period of time is equal to a predetermined value Bmax; a means for measuring an amount of codes Bv of the second coded data in the second predetermined period of time; a comparing means for comparing the amount of codes Bv with the predetermined value Bmax; and a switching means for selecting either the second coded data or the third coded data according to a comparison result of the comparing means. Another video recording apparatus of the present invention is formed of the above variable bit rate video encoder equipped with a means for recording an output of the switching means on a recording medium.

A further video recording apparatus according to the present invention for recording on a recording medium a stream of coded bits produced by compression encoding a video signal, comprises: a storage capacity detecting means for detecting an available storage capacity of the recoding medium; a code amount allocating means for determining an allocated amount of codes to be allocated to a given period of time by examining the available storage capacity and an unrecorded length of the video signal; and means for compression encoding the video signal in the given period of time with the allocated amount of codes.

BRIEF DESCRIPTION OF THE DRAWINGS

FIG. 1 is a block diagram of a video recording apparatus of a first embodiment of the present invention.

FIG. 2 is a block diagram of a coding difficulty detector 101.

FIG. 3 is a block diagram of a coding bit allocator 102.

FIG. 4 is another block diagram of the coding bit allocator 102.

DESCRIPTION OF THE PREFERRED EMBODIMENTS

Figure 5:
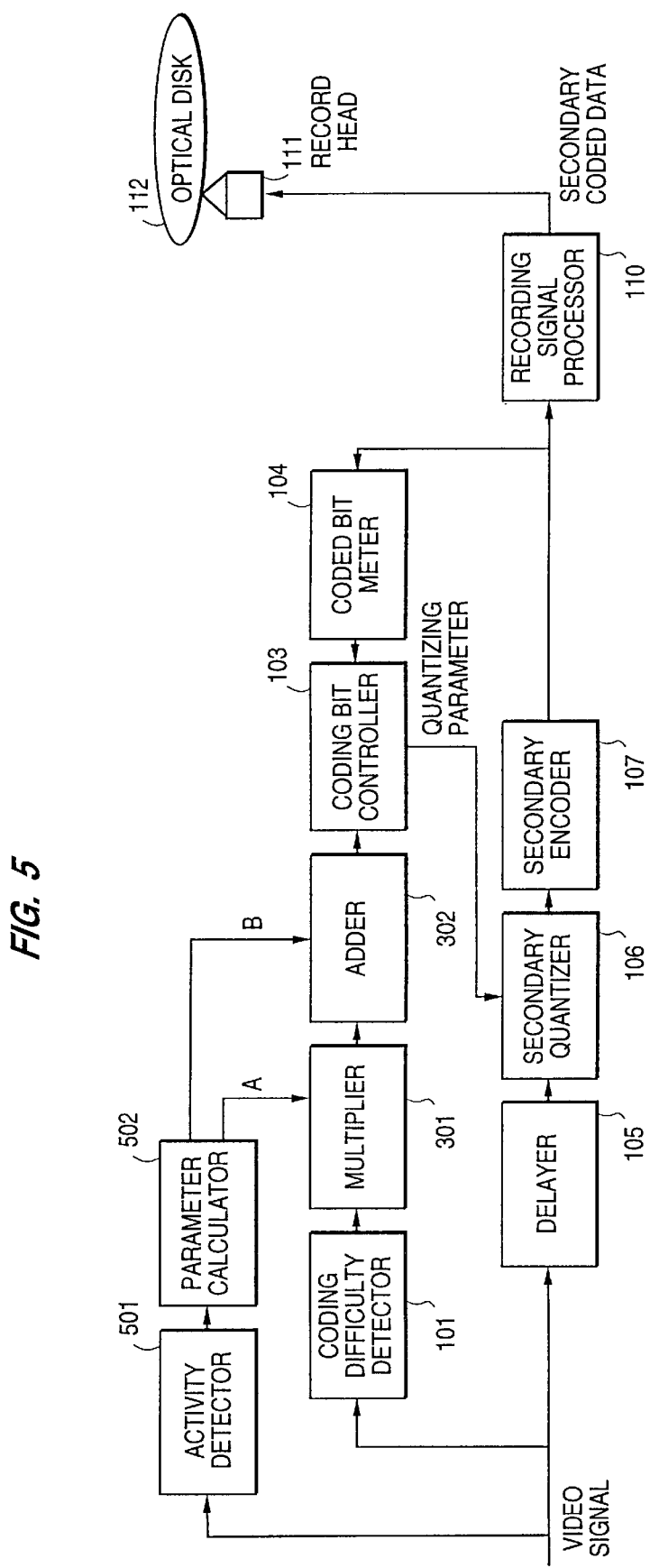
FIG. 5 is a block diagram of a video recording apparatus of a second embodiment of the present invention.

A first embodiment of the pre sent invention in a form of a video recording apparatus will be described referring to relevant drawings. The video recording apparatus is designed for recording on a recording medium a video data encoded by a variable bit rate video encoding apparatus of the present invention. It is understood that the variable bit rate video encoding apparatus will hence be explained at a same time.

FIG. 1 is a block diagram of the video recording apparatus of the first embodiment. A video signal is fed to a coding difficulty detector 101. The coding difficulty detector 101 examines a difficulty of encoding a given length of the video signal and determines a higher degree of a coding difficulty when encoding distortion is exceeded at a same encoding rate. A coding bit allocator 102 is responsive to the coding difficulty for delivering a corresponding amount of allocated coding bits. As the coding difficulty increases, a higher amount of the allocated coding bits are addressed. The video signal is also fed to a delayer 105 where it is delayed by a time required for executing arithmetic operations at the coding difficulty detector 101 and the coding bit allocator 102. A delayed video signal is then transmitted to a secondary quantizer 106 where it is quantized at a quantizing step width which is proportional to a quantizing parameter determined by a coding bit controller 103. A quantized video signal is variable length encoded by a secondary encoder 107 to yield a secondary coded data. A coded bit meter 104 is provided for measuring the amount of bits in a given period of the secondary coded data. The coding bit controller 103 calculates the quantizing parameter for the secondary quantizer 106 so that a difference between the allocated coding bits determined by the cording bit allocator 102 and the bits measured by the coded bit meter 104 is minimized. The secondary coded data produced by the secondary encoder 107 is transferred to a recording signal processor 110 for error correction and recording signal modulation and then recorded by a record head 111 on an optical disk 112.

Through foregoing processing actions, the video signal is encoded at each optimum amount of bits corresponding to the coding difficulty of a target frame, thus allowing an overall reproduced motion image to be uniform in quality. Also, while a delay during encoding is determined by the delayer 105, it can be submitted within a real processing time by determining the optimum amount of the allocated coding bits from time to time.

FIG. 2 is a block diagram of the coding difficulty detector 101 provided in the first embodiment. The video signal is first fed to a primary quantizer 201 where it is quantized with a provisional quantizing parameter. Then, a quantized data is variable length encoded by a primary encoder 202. A coded bit meter 203 is provided for measuring an amount of coded bits in a given period of a primary encoded data produced by the primary encoder 202. In quantization with a fixed quantizing parameter, quantizing resolution is relatively gained thus to increase the amount of the coded bits when the video signal has a high degree of the coding difficulty as its amplitude varies irregularly. When the video signal has a low degree of the coding difficulty as its amplitude varies shortly, the quantizing resolution is relatively low thus to decrease the amount of the coded bits. Accordingly, it is understood that the amount of the coded bits produced by quantization with a fixed quantizing parameter represents a degree of the coding difficulty.

Figure 14:
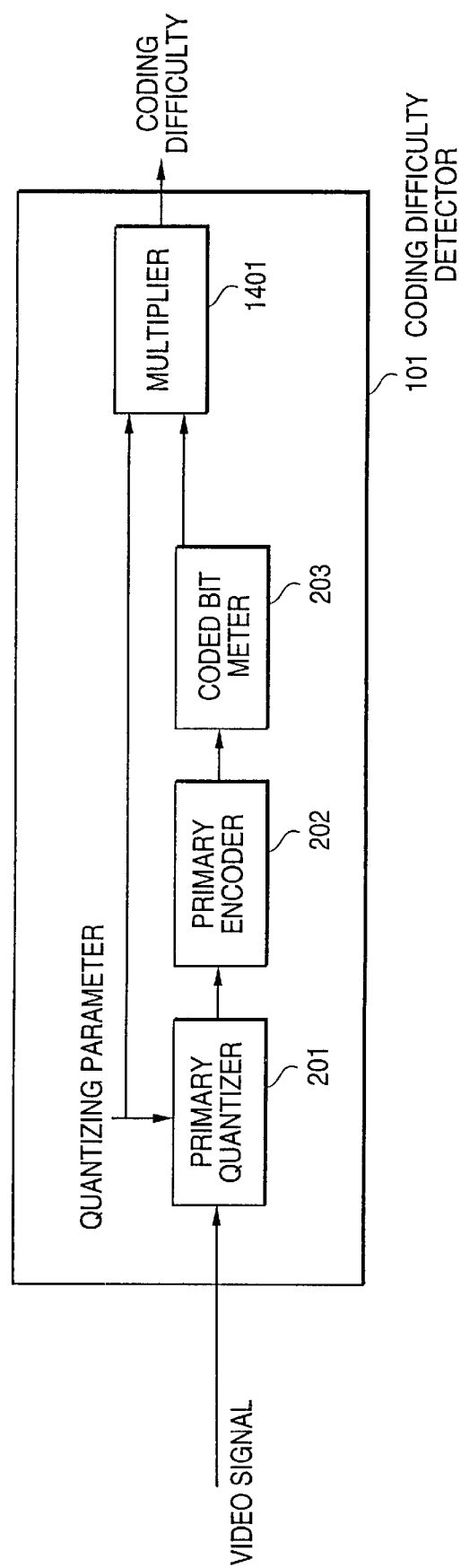
FIG. 14 is another block diagram of the coding difficulty detector 101.

FIG. 14 is another block diagram of the coding difficulty detector 101. As is apparent, a multiplier 1401 is added to an arrangement shown in FIG. 2. The multiplier 1401 calculates a product of the quantizing parameter for the primary quantizer 201 and an output of the coded bit meter 203 and delivers the product as a degree of the coding difficulty. It is known that the quantizing parameter is substantially inverse proportional to the coded bits. This allows a product of the quantizing parameter and the coded bits to be constant. In an arrangement of FIG. 14, the quantizing parameter for the primary quantizer 201 does not need to be fixed to determine a degree of the coding difficulty.

The encoding may be carried out by either an interframe or interfield prediction encoding technique. In such a case, the amount of the coded bits represents a spatial consideration of the coding difficulty for each image and simultaneously, a time consideration of the same between images.

The encoding for determining the coding difficulty may also be executed by the same manner as producing output coded data so that a greater accuracy of the coding difficulty is generated. For example, a hybrid encoding method is used in which both, inframe encoding and interframe prediction encoding, processes are applied for complying to each other at each frame. As the result, the coding difficulty for each frame will be obtained at a higher accuracy.

FIG. 3 is a block diagram of the coding bit allocator 102 in the first embodiment. As shown, the coding difficulty is multiplied by a factor a at a multiplier 301 and then, added with a factor b at an adder 302 to determine the allocated coding bits. This allows the allocated coding bits to be calculated through linear transforming of the coding difficulty.

The linear transform factors may be determined from a multi-mode signal as shown in another block diagram of FIG. 4. For example, the factors a and b are calculated by a parameter calculator 401 depending on standard mode, high-definition mode, long recording mode, or other mode signal. The factors a and b are fed to the multiplier 402 and the adder 403 respectively for converting by linear transform the coding difficulty to the number of the allocated coding bits. This allows the allocated coding bits to be determined using optimum transform parameters in each mode. For instance, if the factor a in a long time recording mode is set to a smaller value than the factor a in a high-definition mode, a number of the allocated coding bits in the long time recording mode will be decreased thus allowing a longer recording operation on a recording medium. Also, in the high-definition mode, the allocated coding bits are set abundant for reproducing a high-definition image.

The coding bit allocator 102 may be adjusted so that the amount of the allocated coding bits stays within a predetermined range. This allows a use of a fixed value of a maximum or minimum coding rate.

A calculation of the coding difficulty is not limited to methods shown in FIGS. 2 and 14 but may be implemented by any other appropriate method.

FIG. 5 is a block diagram of a video recording apparatus of a second embodiment of the present invention. A video signal is introduced and fed to a coding difficulty detector 101 where a degree of the coding difficulty in a period is determined. An activity detector 501 is provided for detecting an activity of the video signal in the same period. A parameter calculator 502 calculates two factors a and b for a multiplier 301 and an adder 302 respectively according to the activity detected by the activity detector 501. The multiplier 301 and the adder 302 are responsive to the two factors a and b for determining in a combination an amount of the allocated coding bits from the coding difficulty of the coding difficulty detector 101. Similar to the first embodiment, this action is followed by a series of encoding steps at a second quantizer 106 and a secondary encoder 107 for producing a second coded data. The second coded data is then transmitted to a recording signal processor 110 and recorded by a record head 111 on an optical disk 112.

If an activity of image data is small, the coding difficulty is low and the allocated coding bits do not need to be increased. When the amount of the allocated coding bits is too small, a deterioration in an image quality due to encoding distortion will occur. The encoding distortion is rather emphasized in an image with a small level of the activity, thus causing a higher quality deterioration. The video recording apparatus shown in FIG. 5 prevents such a drawback by optimizing a linear transform action with the use of the activity or more specifically, subjecting the coding difficulty to non-linear transform action for determining a desired amount of the allocated coding bits. Accordingly, the video signal is encoded depending on its nature and will thus be reproduced at a higher quality.

The activity may be expressed by a correlation result between discrete image signal levels in each image or in different images or in their combination. It is possible that the correlation result is a dispersion value of the discrete image signal levels or an average of absolute error values from mean signal levels in the image.

Figure 6:
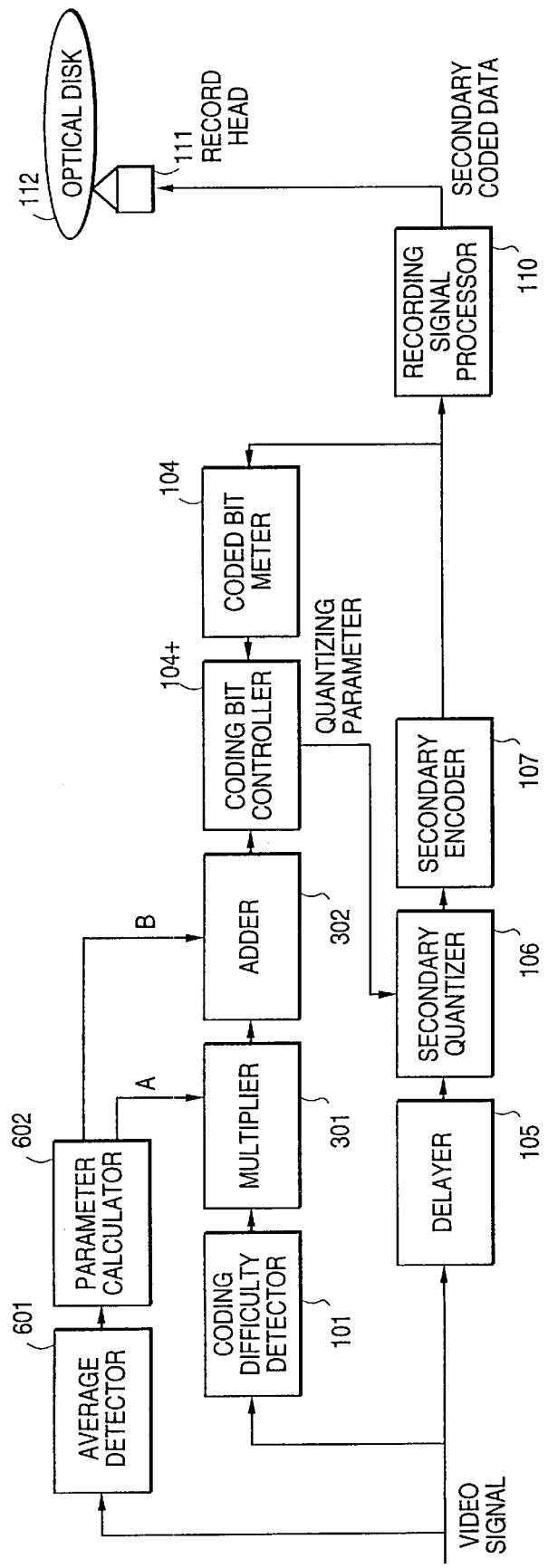
FIG. 6 is a block diagram of a video recording apparatus of a third embodiment of the present invention.

FIG. 6 is a block diagram of a video recording apparatus of a third embodiment of the present invention. A video signal is introduced and fed to a coding difficulty detector 101 for determining a degree of the coding difficulty in a given period. An average detector 601 is provided for detecting an average value of image signal levels in a certain period of the video signal. A parameter calculator 602 calculates two factors a and b for a multiplier 301 and an adder 302 respectively according to the average value detected by the average detector 601. Similar to the second embodiment, the multiplier 301 and the adder 302 are responsive to the two factors a and b for determining in a combination an amount of the allocated coding bits from the coding difficulty of the coding difficulty detector 101. The allocated coding bits are then used in encoding the video signal, thus producing a second coded data which is then recorded on an optical disk 112.

If a signal level of video data is small, the coding difficulty is low and the allocated coding bits do not need to be increased. When the allocated coding bits are too small, a deterioration in the image quality due to encoding distortion will occur. The encoding distortion is rather emphasized when the video signal with a small signal level is increased in luminance, thus causing a higher quality deterioration. The arrangement shown in FIG. 6 prevents such a drawback by optimizing a linear transform action with the use of the average value of the signal levels, i.e. subjecting the coding difficulty to non-linear transform action for determining a desired amount of the allocated coding bits. Accordingly, the video signal is encoded depending on its nature and will thus be reproduced at a higher quality.

Figure 7:
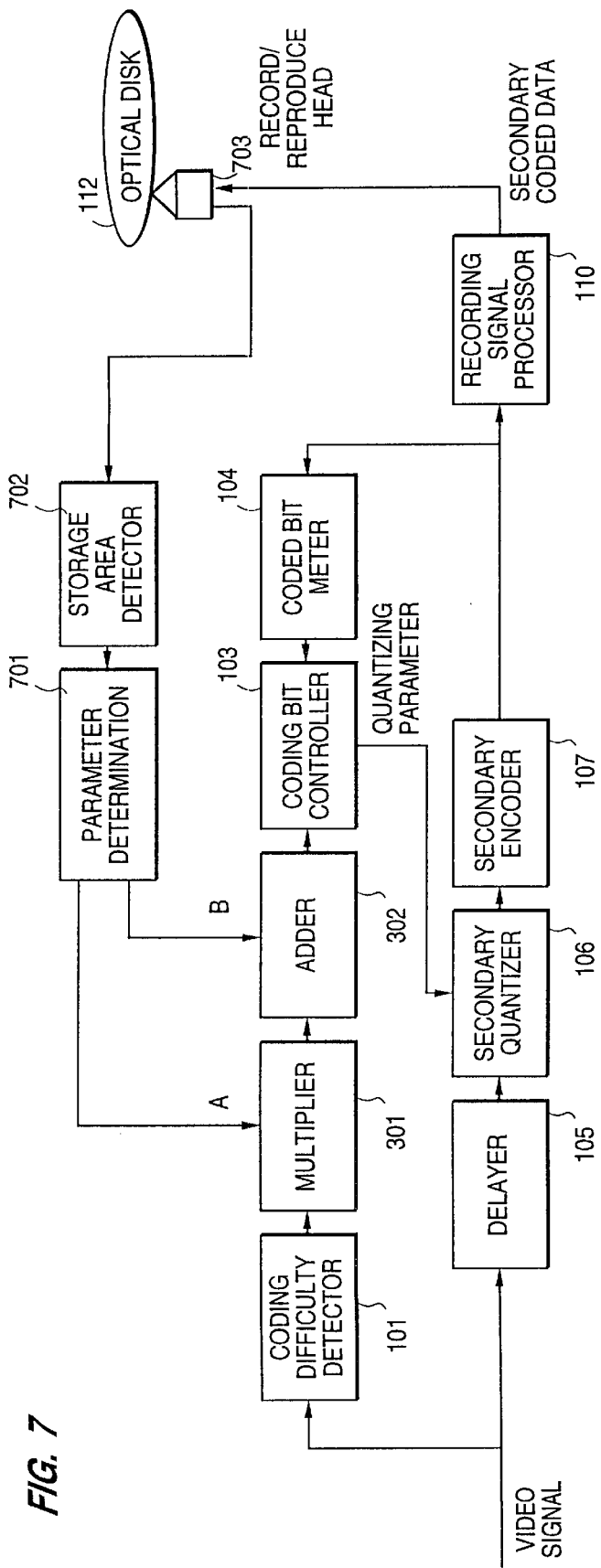
FIG. 7 is a block diagram of a video recording apparatus of a fourth embodiment of the present invention.

FIG. 7 is a block diagram of a video recording apparatus of a fourth embodiment of the present invention. A video signal is introduced and fed to a coding difficulty detector 101 for determining a degree of the coding difficulty in a given period.

A storage area detector 702 is provided for detecting a storage area of a recording medium used. A parameter calculator 701 calculates two factors a and b for a multiplier 301 and an adder 302 respectively according to the storage area detected by the storage area detector 702. Similar to the second embodiment, the multiplier 301 and the adder 302 are responsive to the two factors a and b for determining in a combination an amount of the allocated coding bits from the coding difficulty of a coding difficulty detector 101. The allocated coding bits are then used in encoding of the video signal, thus producing a second coded data which is recorded by a record/reproduce head 703 on an optical disk 112.

The parameter calculator 701 calculates small values of the factors a and b as the storage area of the optical disk is decreased. Subsequently, the amount of the allocated coding bits is lowered thus increasing an overall recording time for the video signal. If the storage area is abundant, corresponding higher values of the factors a and b are selected to record and reproduce the video signal at a higher quality. Accordingly, the allocated coding bits are determined depending on the storage area of the optical disk to be used and will thus be recorded on the optical disk at the best efficiency.

Although the amount of the allocated coding bits is determined through linear transforming of the coding difficulty in previous embodiments, it is illustrative but not of limitation. For example, the allocated coding bits may be calculated from a look-up table showing optimum relation between the coding difficulty and the allocated coding bits.

It is allowable to prepare a plurality of the look-up tables which are attributed to different encoding modes and select one look-up table appropriate to the encoding mode employed for determining a desired amount of the allocated coding bits. It is also possible that the look-up table is based on degrees of the activity of video data or average values of the video signal levels.

Figure 8:
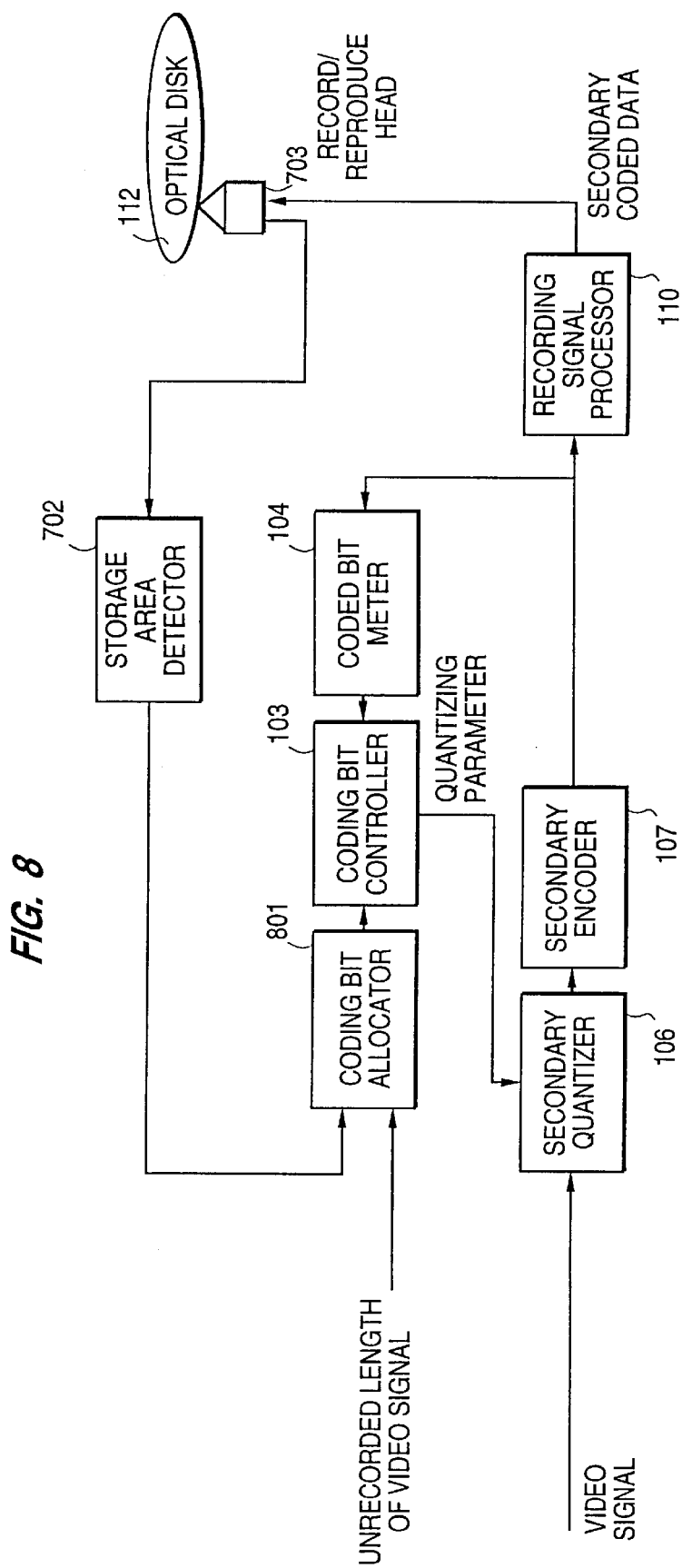
FIG. 8 is a block diagram of a video recording apparatus of a fifth embodiment of the present invention.

FIG. 8 is a block diagram of a video recording apparatus of a fifth embodiment of the present invention. Similar to the fourth embodiment shown in FIG. 7, a video signal introduced is quantized by a secondary quantizer 106 and variable length encoded by a secondary encoder 107 to produce a secondary coded data. The secondary coded data is subjected to error correction and modulation processes at a recording signal processor 110 and recorded by a record/reproduce head 703 on an optical disk 112. A storage area detector 702 is provided for detecting a storage area of the optical disk 112. A coding bit allocator 801 is connected for determining an amount of allocated coding bits from the storage area detected by the storage area detector 702 and an unrecorded length of the video signal to be recorded. A coded bit meter 104 is also provided for measuring an amount of bits of the second coded data in a given period. A coding bit controller 103 is connected for determining a quantizing parameter for the secondary quantizer 106 so that a difference between the allocated coding bits determined by the coding bit allocator 801 and the bits of the second coded data measured by the coded bit meter 104 is minimized.

The coding bit allocator 801 decreases the allocated coding bits when the unrecorded length of the video signal is large and the storage area of the optical disk 112 is small. It increases the allocated coding bits when the unrecorded signal length is small and the storage area is large. Accordingly, the entire length of the video signal can be recorded on the optical disk 112 as having efficiently encoded depending on the storage size of the same.

Figure 9:
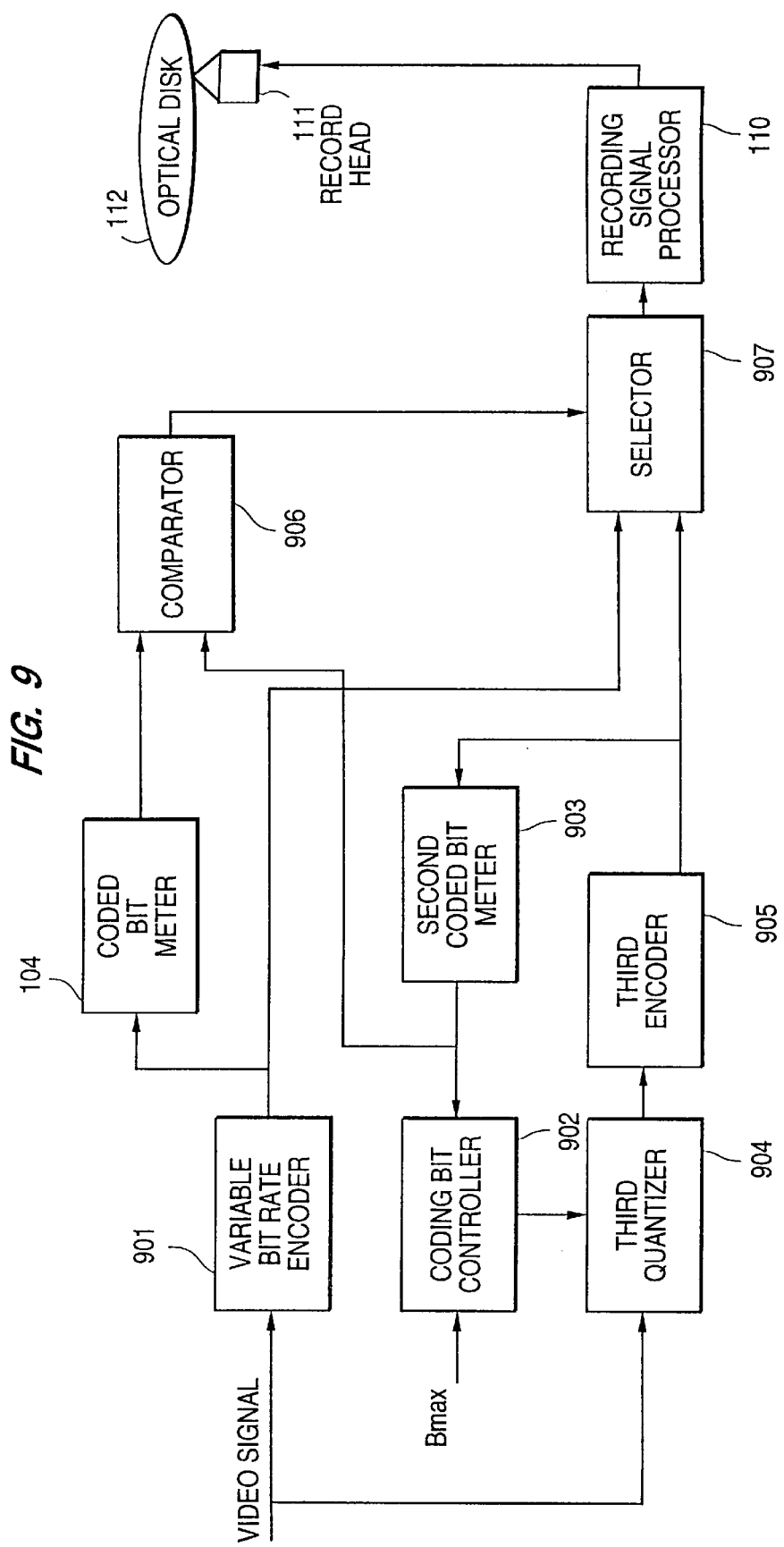
FIG. 9 is a block diagram of a video recording apparatus of a sixth embodiment of the present invention.

FIG. 9 shows a video recording apparatus of a sixth embodiment of the present invention. As shown, a video signal introduced is fed to a variable bit rate encoder 901 where it is encoded on a basis of each group of coding bits in its different video segment to produce a second coded data. Encoding at a variable bit rate to the second coded data may be implemented by any applicable method. Meanwhile, the video signal is quantized by a third quantizer 904 with a quantizing parameter determined by a coding bit controller 902. The video signal is then variable length encoded by a third encoder 905 to yield a third coded data. The third coded data is fed to a second coded bit meter 903 where its coded bits in a given period are measured. Measured coded bits are transmitted to the coding bit controller 902 which in turn determines the quantizing parameter used in the third quantizer 904 so that a coding rate of the third coded data is equal to Bmax. More particularly, the third coded data is regarded as data encoded at a fixed encoding rate Bmax.

A comparator 906 is provided for comparing an output or coded bits of the second coded data from a first coded bit meter 104 with an output or coded bits of the third coded data from the second coded bit meter 903. A selector 907 is responsive to an output of the comparator 906 for selecting and passing either the second or third coded data which is smaller in an amount of the coded bits.

According to the sixth embodiment, a largest coding rate for coding the video signal is controlled not to exceed the fixed encoding rate Bmax. In any action of recording or reproducing data on a recording medium, e.g. an optical disk or a magnetic disk, or transmitting data through a variable transmission rate associated route, a specific transmission rate is used. If the transmission rate exceeds its maximum value, a buffer at the data input will fall in underflow interrupting a normal transmitting action. It is thus needed to predetermine a largest value of the variable bit rate. The video recording apparatus can determine the largest value of the variable bit rate to be subdued while each segment of the video signal is encoded at its optimum encoding bit rate.

Although the coded bits of the third coded data to the comparator 906 are determined by the second coded bit meter 903, they may be decided from the largest rate Bmax.

Figure 10:
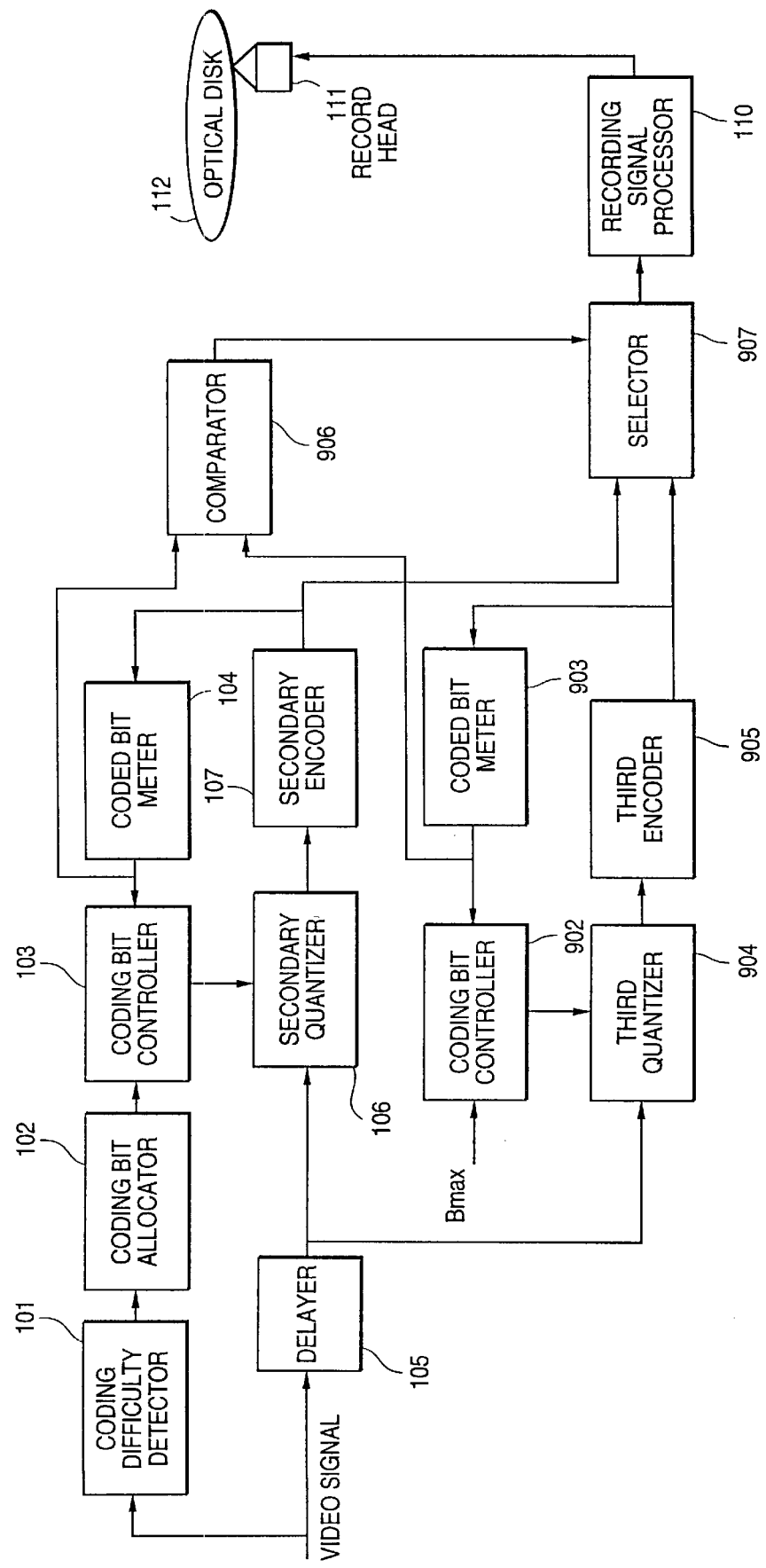
FIG. 10 is a block diagram of a video recording apparatus of a seventh embodiment of the present invention.

FIG. 10 is a block diagram of a video recording apparatus of a seventh embodiment of the present invention. The video recording apparatus shown in FIG. 10 is differentiated from that of the sixth embodiment by a fact that the variable bit rate encoder 901 shown in FIG. 9 is replaced with the video encoder arrangement explained with FIG. 1.

A coding difficulty detector 101 is provided for detecting a coding difficulty of encoding a video signal in a given period. A coding bit allocator 102 is responsive to the coding difficulty for determining an amount of allocated coding bits. A delayer 105 is also provided for delaying the video signal by a time corresponding to the allocated coding bits. A delayed video signal is then quantized by a secondary quantizer 106. A quantization is executed with a quantizing step width proportional to a quantizing parameter determined by a first coding bit controller 103. A quantized video signal is variable length encoded by a secondary encoder 107 to produce a second coded data. An amount of coded bits in a period of the second coded data is measured by a first coded bit meter 104. The first coding bit controller 103 calculates the quantizing parameter so that a difference between the allocated coding bits and the coded bits in the period is minimized.

The delayed video signal from the delayer 105 is transmitted to a third quantizer 904 where it is quantized with a quantizing parameter determined by a second coding bit controller 902. A quantized video signal of the third quantizer 904 is variable length encoded by a third encoder 905 to produce a third coded data. An amount of coded bits in a period of the third coded data is measured by a second coded bit meter 903. The coded bits of the third coded data are transferred to the second coding bit controller 902. The second coding bit controller 902 calculates the quantizing parameter for the third quantizer 904 so that a coding bit rate of the third coded bits is equal to a predetermined largest value Bmax. More specifically, the third coded data is regarded as data encoded at Bmax of a fixed bit rate. A comparator 906 is provided for comparing the amount of the coded bits of the second coded data from the first coded bit meter 104 with the amount of the coded bits of the third coded data from the second coded bit meter 903. A selector 907 is responsive to an output of the comparator 906 for selecting and passing either the second or third coded data which is smaller in the amount of the coded bits.

According to the seventh embodiment, the largest coding rate for encoding the video signal is controlled not to exceed the predetermined rate Bmax.

Figure 11:
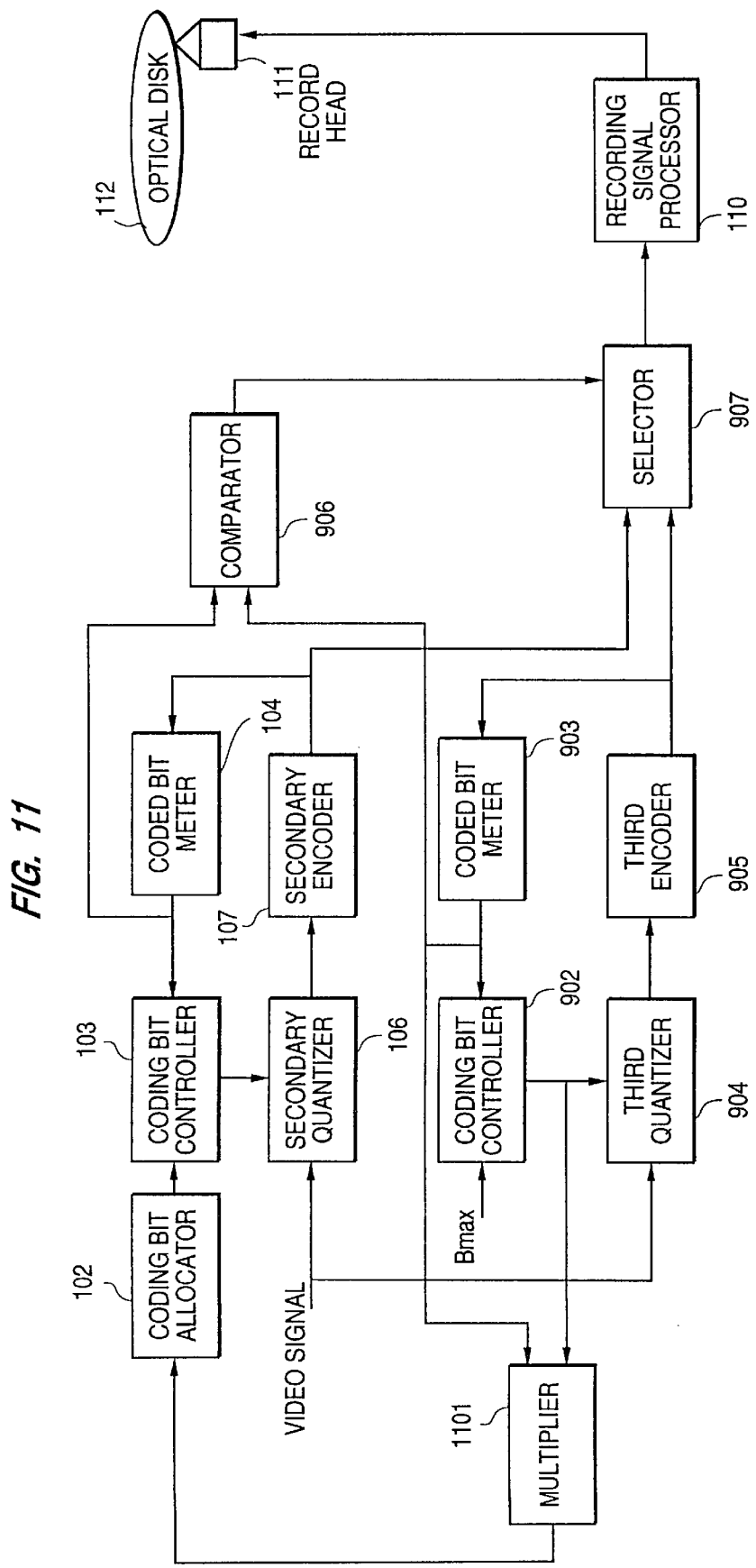
FIG. 11 is a block diagram of a video recording apparatus of an eighth embodiment of the present invention.

FIG. 11 is a block diagram of a video recording apparatus of an eighth embodiment of the present invention. The video recording apparatus shown in FIG. 11 is differentiated from that of the seventh embodiment by a fact that a degree of the coding difficulty is determined in an encoder arrangement with the fixed coding rate shown in FIG. 10. A principle of determining the coding difficulty is identical to a function of the coding difficulty detector shown in FIG. 14. Similar to an action of the video recording apparatus shown in FIG. 10, a video signal is encoded at a fixed coding rate of Bmax by a combination of a third quantizer 904 and a third encoder 905 to produce a third coded data. Also, the video signal is encoded at a variable coding rate by a second quantizer 106 and a second encoder 107 to yield a second coded data. One of the second and third coded data is selected by an action of a selector 907 depending on an amount of coded bit in a given period and recorded on an optical disk 112. An amount of allocated coding bits for the second coded data is determined by a coding bit allocator 102 according to a degree of the coding difficulty. The coding difficulty supplied to the coding bit allocator 102 is calculated by a multiplier 1101 in which an output of a second coded bit meter 903 or an amount of coded bits in a period of the third coded data is multiplied by an output of a second coding bit controller 902 or a quantizing parameter for the third quantizer 904.

It is known that the quantizing parameter is substantially inverse proportional to an amount of bits of quantized and encoded data. Hence, a product of the quantizing parameter and the amount of coded bits is nearly constant. This allows the product of the quantizing parameter and a code length of the third coded data encoded at a fixed coding rate to represent a degree of the coding difficulty. Accordingly, an encoder arrangement of this embodiment acts as both a coding difficulty detector and a fixed coding rate encoder with a coding rate of Bmax.

Figure 12:
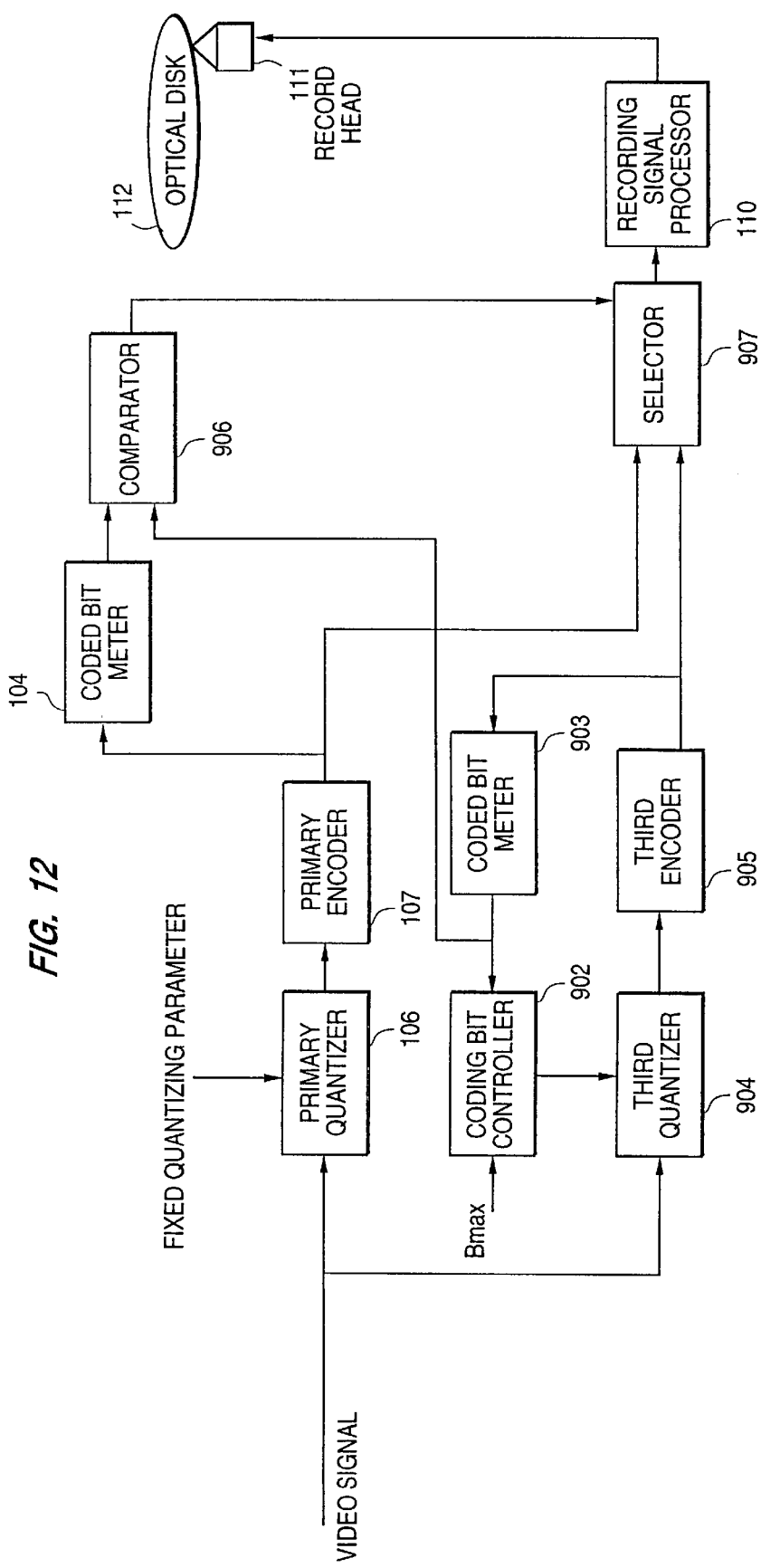
FIG. 12 is a block diagram of a video recording apparatus of a ninth embodiment of the present invention.

FIG. 12 is a block diagram of a video recording apparatus of a ninth embodiment of the present invention. Similar to the seventh embodiment, a video signal is encoded at a fixed largest coding rate of Bmax by a combination of a third quantizer 904, a third encoder 905, a coding bit controller 902, and a second coded bit meter 903 to yield a third coded data. Also, the video signal is quantized by a second quantizer 106 using a fixed quantizing parameter and variable length encoded by a second encoder 107 to produce a second coded data. As the quantizing parameter is a constant value, the second coded data has a variable bit rate. An amount of bits in a given period of the second coded data is measured by a first coded bit meter 104. A comparator 906 compares an output of the first bit meter 104 or the amount of bits of the second coded data with an output of the second coded bit meter 903 or the amount of bits in a period of the third coded data. A selector 907 is responsive to a comparing result of the comparator 906 for selecting and passing either the second or third coded data which is smaller in the amount of coded bits.

According to the ninth embodiment, one of the two coded data, a variable bit rate coded data quantized with the fixed quantizing parameter and a fixed bit rate coded data processed with Bmax of the fixed largest coding rate, which is smaller in the coding rate is selected and delivered. As a result, the largest coding rate for the coded data to be passed is defined by Bmax.

Figure 13:
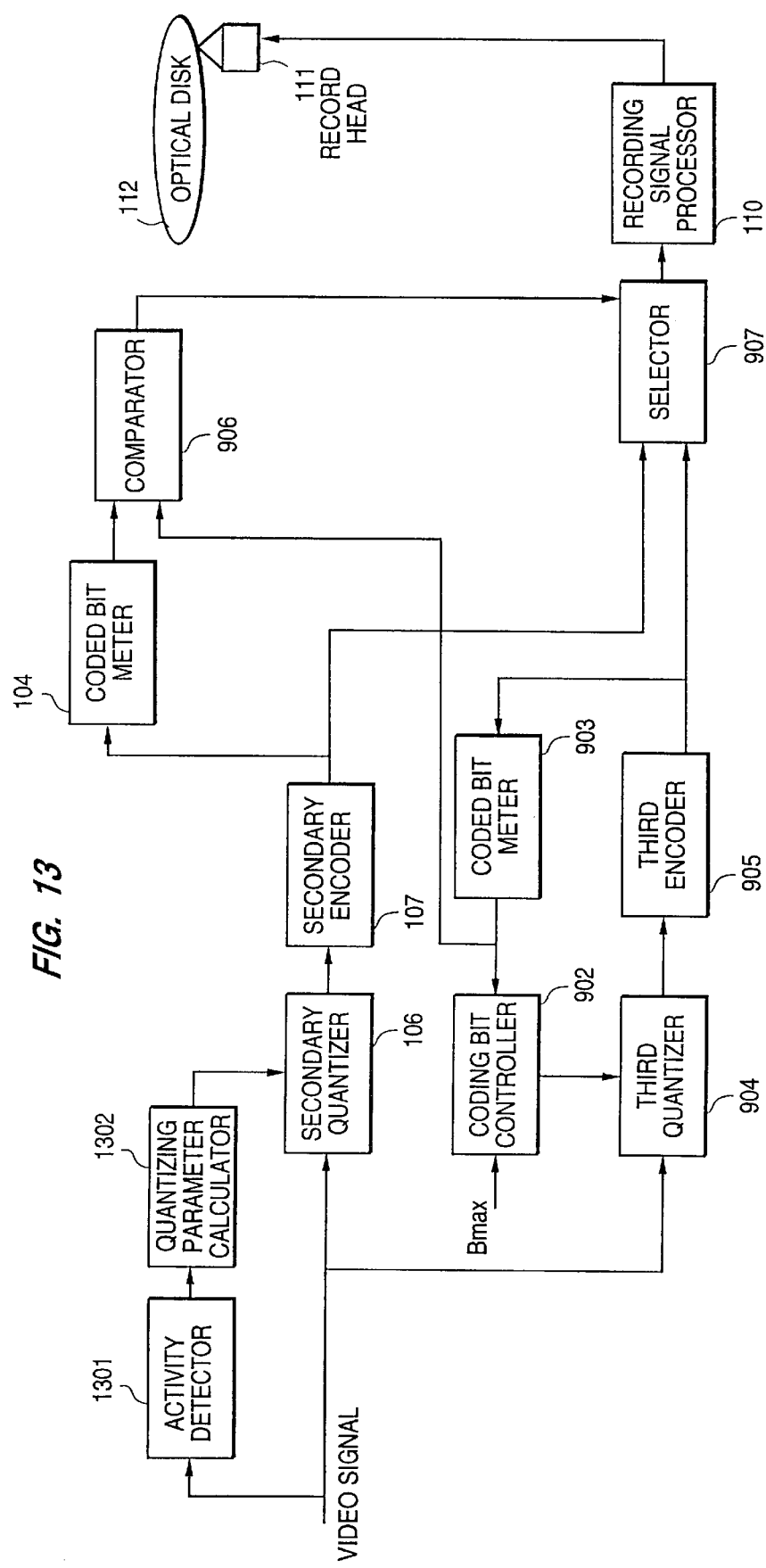
FIG. 13 is a block diagram of a video recording apparatus of a tenth embodiment of the present invention.

FIG. 13 is a block diagram of a video recording apparatus of a tenth embodiment of the present invention. Similar to the seventh embodiment, a video signal is encoded at a fixed coding rate of Bmax by a combination of a third quantizer 904, a third encoder 905, a coding bit controller 902, and a second coded bit meter 903 to yield a third coded data. Also, the video signal is quantized by a second quantizer 106 using a fixed quantizing parameter and variable length encoded by a second encoder 107 to produce a second coded data. An activity detector 1301 is provided for detecting an activity of the video signal. A quantizing parameter calculator 1302 is responsive to the activity from the activity detector 1301 for determining a quantizing parameter used in a second quantizer 106. As the activity is increased, the quantizing parameter calculator 1302 produces a higher value of the quantizing parameter. When the activity is small, i.e. its video data represents a plain image, the quantizing parameter is decreased. Accordingly, coding distortion created during the quantization will be minimized. Also, the video data with a low activity level will be encoded at high efficiency because an amount of its coded bits stays low even when the quantizing parameter is decreased. Coding distortion of the video data with a high activity level remains less visible even if the quantizing parameter is increased and also, an amount of coded bits of the same will be prevented from exceeding.

A first coded bit meter 104 is provided for measuring an amount of bits in a given period of the second coded data. An amount of bits in a period of the third coded data is measured by the second coded bit meter 903. A comparator 906 compares an output of the first bit meter 104 with an output of the second coded bit meter 903. A selector 907 is responsive to a comparing result of the comparator 906 for selecting and passing either the second or third coded data which is smaller in the amount of bits. A selected coded data is then recorded on an optical disk 112.

According to the tenth embodiment, one of two coded data, a variable bit rate coded data quantized with the quantizing parameter defined by the activity of a video data and a fixed bit rate coded data processed with Bmax of the fixed largest coding rate, which is smaller in the coding rate is selected and delivered. As a result, the largest coding rate for the coded data to be passed is defined by Bmax.

The activity level may be expressed by a correlation result between discrete image signal levels in each image or in difference images or in their combination. It is possible that the correlation result is a dispersion value of discrete image signal levels or an average of absolute error values from a mean signal level in the image.

The recording medium in which a video signal is recoded with the video recording apparatus of the tenth embodiment is not limited to an optical disk but any appropriate medium such as a magnetic recording disk will be used with equal success.

The encoding method may be a transform encoding method such as DCT, a frequency division coding method such as sub-band encoding, or a vector quantization encoding method.

Also, it may be intraframe or infield encoding method, interframe or interfield encoding method, or their combination known as a hybrid encoding method.

The video signal may also be recorded on a recording medium together with audio or other relevant information.

What is claimed is:

1. A variable bit rate video encoder comprising:
   a coding difficulty detcting means for detecting a degree of difficulty of encoding a video signal in a first predetermined period of time;
   a code amount allocating means for producing an allocated amount of codes by converting the degree of difficulty according to a specific transform characteristic so that the allocated amount of codes increases when the degree of difficulty increases;
   a quantizing means for quantizing the video signal by using a quantizing parameter;
   an encoding means for variable length encoding an output of the quantizing means to produce a first coded data; and
   a code amount controlling means for determining the quantizing parameter used by the quantizing means based on an amount of codes of the first coded data and the allocated amount of codes.

2. A variable bit rate video encoder according to claim 1, wherein the coding difficulty detecting means comprises:
   another quantizing means for quantizing the video signal with a quantizing step width proportional to a provisional quantizing parameter;
   another encoding means for viable length encoding an output of said another quantizing means to produce a second coded data; and
   a means for measuring a code length of the second coded data in the first predetermined period of time and delivering the code length as the degree of the difficulty.

3. A variable bit rate video encoder according to claim 1, wherein the coding difficulty detecting means comprises:
   another quantizing means for quantizing the video signal with a quantizing step width proportional to a first quantizing parameter;
   another encoding means for variable length encoding an output of said another quantizing means to produce a second coded data;
   a means for measuring a code length of the second coded data in the first predetermined period of time; and
   a means for calculating a product of the first quantizing parameter and the code length, and delivering the product as the degree of the difficulty.

4. A variable bit rate video encoder according to claim 3, further comprising:
   a means for determining the first quantizing parameter so that a code length of the second coded data in the second predetermined period of time is equal to predetermined value Bmax;
   a means for measuring a code length Bv of the first coded data in the second predetermined period of time;
   a comparing means for comparing the code length Bv with the predetermined value Bmax; and
   a switching means for selecting the second coded data in the second predetermined period of time when the code length Bv is greater than the predetermined value Bmax and selecting the first coded data when the code length Bv is not greater than the predetermined value Bmax.

5. A variable bit rate video encoder according to claim 1, wherein the transform characteristic in the code amount allocating means is varied depending on a plurality of modes.

6. A variable bit rate video encoder according to claim 1, further comprising an activity measuring means for measuring an activity of the video signal, wherein the transform characteristic in the code amount allocating means is determined by the activity.

7. A variable bit rate video encoder according to claim 6, wherein the activity measuring means measures a correlation between pixel levels of a single image or of adjacent images or of their combination.

8. A variable bit rate video encoder according to claim 1, further comprising a means for measuring an average of the video signal in the first predetermined period of time, wherein the transform characteristic in the code amount allocating means is determined by the average.

9. A variable bit rate video encoder according to claim 1, wherein for recording the second coded data on a recording medium, the transform characteristic in the code amount allocating means is determined by an available storage capacity on the recording medium or a recording length of time of the video signal.

10. A variable bit rate video encoder according to claim 1, wherein the code amount allocating means produces the allocated amount of codes by linear transform processing the degree of difficulty.

11. A variable bit rate video encoder according to claim 1, wherein the code amount allocating means produces the allocated amount of codes from a look-up table which shows a relationship between the degree of difficulty and the allocated amount of codes.

12. A variable bit rate video encoder according to claim 1, wherein the code amount allocating means limits the allocated amount of codes in the first predetermined period of time to be within a predetermined range.

13. A variable bit rate video encoder according to claim 1, further comprising.
   a fixed bit rate encoding means for producing a third coded data so that an amount of codes of the third coded data in a second predetermined period of time is equal to a predetermined value Bmax,
   a measuring means for measuring an amount of codes Bv of the first coded data in the second predetermined period of time;
   a comparing means for comparing the amount of codes Bv with the predetermined value Bmax; and
   a switching means for selecting either the first coded data or the third coded data according to a comparison result by the comparing means.

14. A video recording apparatus comprising:
   a coding difficulty detecting means for detecting a degree of difficulty of encoding a video signal in a first predetermined period of time;
   a code amount allocating means for producing an allocated amount of codes by converting the degree of difficulty according to a specific transform characteristic so that the allocated amount of codes increases when the degree of difficulty increases;
   a quantizing means for quantizing the video signal by using a quantizing parameter;
   an encoding means for variable length encoding an output of the quantizing means to produce a first coded data; and
   a code amount controlling means for determining the quantizing parameter used by the quantizing means based on an amount of codes of the first coded data and the allocated amount of codes; and a means for recording the first coded data on a recording medium.

15. A video recording apparatus according to claim 14, wherein the coding difficulty detcting means comprises, another quantizing means for quantizing the video signal with a quantizing step width proportional to a provisional quantizing parameter;

another encoding means for variable length encoding an output of said another quantizing means to produce a second coded data; and a means for measuring a code length of the second coded data in the first predetermined period of time and delivering the code length as the degree of the difficulty.

16. A video recording apparatus according to claim 14, wherein the coding difficulty detecting means comprises:

another quantizing means for quantizing the video signal with a quantizing step width proportional to a first quantizing parameter;

another encoding means for variable length encoding an output of said another quantizing means to produce a second coded data;

a means for measuring a code length of the second coded data in the first predetermined period of time; and a means for calculating a product of the first quantizing parameter and the code length, and delivering the product as the degree of the difficulty.

17. A video recording apparatus according to claim 16, further comprising:

a means for determining the first quantizing parameter so that a code length of the second coded data in the second predetermined period of time is equal to a predetermined value Bmax;

a means for measuring a code length Bv of the first coded data in the second predetermined period of time;

a comparing means for comparing the code length Bv with the predetermined value Bmax;

a switching means for selecting the second coded data in the second predetermined period of time when the code length Bv is greater than the predetermined value Bmax and selecting the first coded data when the code length Bv is not greater than the predetermined value Bmax; and a means for recording an output of the switching means on the recording medium.

18. A video recording apparatus according to claim 14, wherein the transform characteristic in the code amount allocating means is varied depending on a plurality of modes.

19. A video recording apparatus according to claim 14, further comprising an activity measuring means for measuring an activity of the video signal, wherein the transform characteristic in the code amount allocating means is determined by the activity.

20. A video recording apparatus according to claim 19, wherein the activity measuring means measures a correlation between pixel levels of a single image or of adjacent images or of their combination.

21. A video recording apparatus according to claim 14, further comprising a means for measuring an average of the video signal in the first predetermined period of time, wherein the transform characteristic in the code amount allocating means is determined by the average.

22. A video recording apparatus according to claim 14, wherein the transform characteristic in the code amount allocating means is determined by an available storage capacity on the recording medium or a recording length of time of the video signal.

23. A video recording apparatus according to claim 14, wherein the code amount allocating means produces the allocated amount of codes by linear transform processing the degree of difficulty.

24. A video recording apparatus according to claim 14, wherein the code amount allocating means produces the allocated amount of codes from a look-up table which shows a relationship between the degree of difficulty and the allocated amount of codes.

25. A video recording apparatus according to claim 14, wherein the code amount allocating means limits the allocated amount of codes in the first predetermined period of time to be within a predetermined range.

26. A video recording apparatus according to claim 14, further comprising:

a fixed bit rate encoding means for producing a third coded data so that an amount of codes in a second predetermined period of time is equal to a predetermined value Bmax;

a measuring means for measuring an amount of codes Bv of the first coded data in the second predetermined period of time;

a comparing means for comparing the amount of codes Bv with the predetermined value Bmax; and a switching means for selecting either the first coded data or the third coded data according to a comparison result by the comparing means; and a means for recording an output of the switching means on the recording medium.

* * * * *